United States Patent
Hong

(10) Patent No.: US 12,519,348 B2
(45) Date of Patent: Jan. 6, 2026

(54) CONFIRMATION METHOD AND APPARATUS FOR WIRELESS CHARGING INFORMATION, DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 336 days.

(21) Appl. No.: 18/287,289

(22) PCT Filed: Apr. 19, 2021

(86) PCT No.: PCT/CN2021/088190
§ 371 (c)(1),
(2) Date: Oct. 17, 2023

(87) PCT Pub. No.: WO2022/221999
PCT Pub. Date: Oct. 27, 2022

(65) Prior Publication Data
US 2024/0372411 A1 Nov. 7, 2024

(51) Int. Cl.
*H02J 50/80* (2016.01)
*H02J 50/20* (2016.01)
*H04W 4/24* (2024.01)
*H04W 8/22* (2009.01)
*H04W 24/02* (2009.01)
*H04W 36/08* (2009.01)
*H04W 76/10* (2018.01)

(52) U.S. Cl.
CPC ............. *H02J 50/80* (2016.02); *H04W 8/22* (2013.01); *H04W 24/02* (2013.01); *H04W 76/10* (2018.02)

(58) Field of Classification Search
None
See application file for complete search history.

(56) References Cited

U.S. PATENT DOCUMENTS 9,972,037 B1 * 5/2018 Sridharan ............... H02J 50/20
9,979,221 B2 * 5/2018 Chin ....................... H02J 50/80
(Continued)

FOREIGN PATENT DOCUMENTS

CN 103167588 A 6/2013
CN 103581960 A 12/2014
(Continued)

OTHER PUBLICATIONS

PCT/CN2021/088190, International Search Report dated Jan. 20, 2022, 2 pages.
(Continued)

*Primary Examiner* — Jenee Holland
(74) *Attorney, Agent, or Firm* — Cozen O'Connor

(57) ABSTRACT

A method for confirming wireless charging information, performed by a first network device is provided. The method includes sending wireless charging information of the first network device and/or a third network device to a second network device, in which the third network device is a network device of a neighboring cell of the first network device, and the wireless charging information is configured to indicate a wireless charging capability of the first network device and/or the third network device.

20 Claims, 6 Drawing Sheets

(56) References Cited

U.S. PATENT DOCUMENTS

| | | | | |
|---|---|---|---|---|
| 2007/0025245 | A1* | 2/2007 | Porras | H04W 99/00 |
| | | | | 370/252 |
| 2013/0288600 | A1* | 10/2013 | Kuusilinna | H02J 50/12 |
| | | | | 455/41.2 |
| 2014/0194092 | A1* | 7/2014 | Wanstedt | H04W 4/24 |
| | | | | 455/406 |
| 2018/0034303 | A1* | 2/2018 | Dow | H02J 50/12 |
| 2019/0148969 | A1* | 5/2019 | Casse | H02J 50/23 |
| | | | | 320/108 |
| 2021/0013750 | A1* | 1/2021 | Kronander | H02J 50/80 |
| 2021/0119496 | A1* | 4/2021 | Smith | H02J 7/00045 |
| 2022/0038138 | A1* | 2/2022 | Beckman | H02J 50/10 |
| 2022/0200321 | A9* | 6/2022 | Hua | H04W 4/00 |
| 2024/0163930 | A1* | 5/2024 | Hong | H02J 50/402 |
| 2024/0172065 | A1* | 5/2024 | Hong | H02J 50/80 |
| 2024/0196466 | A1* | 6/2024 | Hong | H04W 8/22 |
| 2024/0381192 | A1* | 11/2024 | Hong | H04W 36/0061 |

FOREIGN PATENT DOCUMENTS

| | | |
|---|---|---|
| CN | 107086609 A | 8/2017 |
| CN | 108696881 A | 10/2018 |
| CN | 111510906 A | 8/2020 |

OTHER PUBLICATIONS

European Patent Application No. 21937250.5 Search and Opinion dated Mar. 15, 2024, 12 pages.
Indian Patent Application No. 202347078268 Office Action dated Aug. 14, 2025, 6 pages.

* cited by examiner

CONFIRMATION METHOD AND APPARATUS FOR WIRELESS CHARGING INFORMATION, DEVICE, AND STORAGE MEDIUM

CROSS-REFERENCE TO RELATED APPLICATION

This application is a U.S. national phase application of International Patent Application No. PCT/CN2021/088190, filed on Apr. 19, 2021, the entire contents of which are incorporated herein by reference.

FIELD

An embodiment of the present disclosure relates to, but is not limited to, the field of wireless communication, and more particularly to a method for confirming wireless charging information, an apparatus for confirming wireless charging information, a device, and a storage medium.

BACKGROUND

Wireless charging technologies are mainly divided into three categories, an electromagnetic induction technology, an electromagnetic resonance technology, and a wireless radio frequency technology. Air-to-air charging belongs to the wireless radio frequency technology, and a space electric field is taken as a medium for energy transmission. For example, energy may be transmitted to a terminal via a large number of antennas in a form of millimeter-wave extremely narrow beams, and the terminal may receive it via a miniature beacon antenna, thus realizing long-distance wireless charging.

With the development of a cellular mobile communication technology, especially a millimeter wave communication technology, more and more antennas may be equipped on a network device, such as a base station. Therefore, how to realize wireless charging through a cellular network is a problem to be solved.

SUMMARY

According to a first aspect of an embodiment of the present disclosure, there is provided a method for confirming wireless charging information. The method is performed by a first network device. The method includes sending wireless charging information of the first network device and/or a third network device to a second network device, in which the third network device is a network device of a neighboring cell of the first network device, and the wireless charging information is configured to indicate a wireless charging capability of the first network device and/or the third network device.

According to a second aspect of an embodiment of the present disclosure, there is provided a method for determining wireless charging information. The method is performed by a second network device. The method includes receiving wireless charging information of a first network device and/or a third network device sent by the first network device, in which the third network device is a network device of a neighboring cell of the first network device, and the wireless charging information is configured to indicate a wireless charging capability of the first network device and/or the third network device.

According to a third aspect of an embodiment of the present disclosure, there is provided a communication device. The communication device at least includes a processor and an interface circuit, in which the interface circuit is configured to receive code instructions and transmit them to the processor, the processor is configured to execute the code instructions to perform steps in any of the above-mentioned methods.

BRIEF DESCRIPTION OF THE DRAWINGS

The accompanying drawings, which are incorporated in and constitute a part of this specification, illustrate embodiments consistent with the present disclosure and, together with the description, serve to explain the principles of the embodiments of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

Terms used herein in embodiments of the present disclosure are only for the purpose of describing specific embodiments, but should not be construed to limit the present disclosure. As used in the embodiments of the present disclosure and the appended claims, "a/an," and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" and "in case that" may be construed to mean "when" or "upon" or "in response to determining" depending on the context.

To better describe any embodiment of the present disclosure, an embodiment of the present disclosure takes an application scenario of access control as an example for illustrative description.

The present disclosure provides a method for confirming wireless charging information, an apparatus for confirming wireless charging information, a device, and a storage medium.

Figure 1:
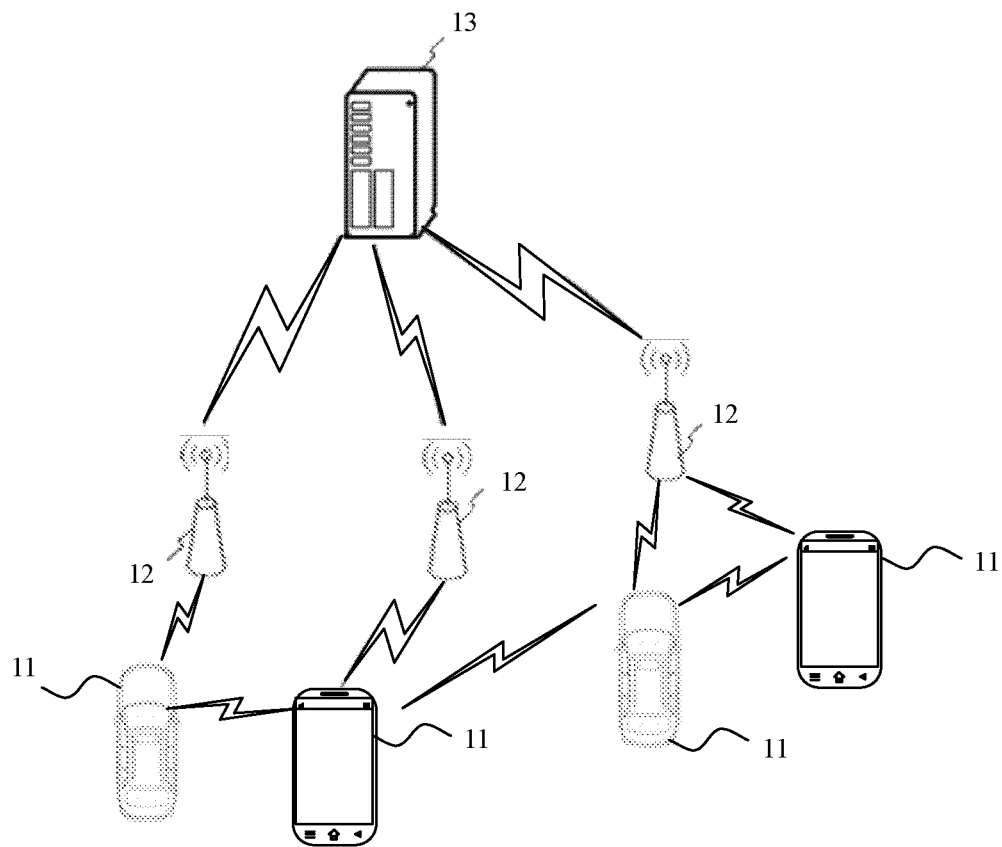
FIG. 1 is a schematic diagram showing a wireless communication system according to an illustrative embodiment.

Referring to FIG. 1, FIG. 1 is a schematic diagram showing a wireless communication system provided in an embodiment of the present disclosure. As shown in FIG. 1, the wireless communication system is a communication system based on a cellular mobile communication technology, and may include several terminals 11 and several base stations 12.

The terminal 11 may be a device that provides voice and/or data connectivity to a user. The terminal 11 can communicate with one or more core networks via a radio access network (RAN). The terminal 11 can be an Internet of Things terminal, such as a sensor device, a mobile phone (or referred to as a "cellular" phone) and a computer with an Internet of Things terminal. For example, it can be a fixed, portable, pocket-sized, handheld, built-in computer or vehicle-mounted apparatus. For example, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be a device of an unmanned aerial vehicle. Alternatively, the terminal 11 may be a vehicle-mounted device, for example, a driving computer with a wireless communication function, or a wireless terminal externally connected with a driving computer. Alternatively, the terminal 11 may be a roadside device, such as a street lamp, a signal lamp or other roadside devices with a wireless communication function.

The base station 12 may be a network side device in the wireless communication system. The wireless communication system can be a 4th generation mobile communication (4G) system, also referred to as a long term evolution (LTE) system. Alternatively, the wireless communication system may be a 5G system, also referred to as a new radio (NR) system or a 5G NR system. Alternatively, the wireless communication system may be a next generation system of the 5G system. The access network in the 5G system can be referred to as a new generation-radio access network (NG-RAN).

The base station 12 may be an evolved base station (eNB) used in the 4G system. Alternatively, the base station 12 may be a centralized distributed architecture base station (gNB) used in the 5G system. When the base station 12 adopts the centralized distributed architecture, it usually includes a central unit (CU) and at least two distributed units (DUs). A protocol stack of a packet data convergence protocol (PDCP) layer, a radio link control (RLC) layer and a media access control (MAC) layer is provided in the central unit. A protocol stack of a physical (PHY) layer is provided in the distributed unit. The specific implementation of the base station 12 is not limited in the embodiments of the present disclosure.

A wireless connection can be established between the base station 12 and the terminal 11 through a wireless radio. In different embodiments, the wireless radio is a wireless radio based on the 4th generation mobile communication network technology (4G) standard. Alternatively, the wireless radio is a wireless radio based on the 5th generation mobile communication network technology (5G) standard. For example, the wireless radio is a new radio. Alternatively, the wireless radio can also be a wireless radio based on the next generation mobile communication network technology standard of the 5G.

In some embodiments, an end to end (E2E) connection may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the wireless communication system may further include a network management device 13.

Several base stations 12 are connected to the network management device 13, respectively. The network management device 13 may be a core network device in the wireless communication system, for example, the network management device 13 may be a mobility management entity (MME) in an evolved packet core (EPC). Alternatively, the network management device may be other core network devices, such as a serving gateway (SGW), a public data network gateway (PGW), a policy and charging rules function (PCRF) or a home subscriber server (HSS). The implementation form of the network management device 13 is not limited in the embodiment of the present disclosure.

Figure 2:
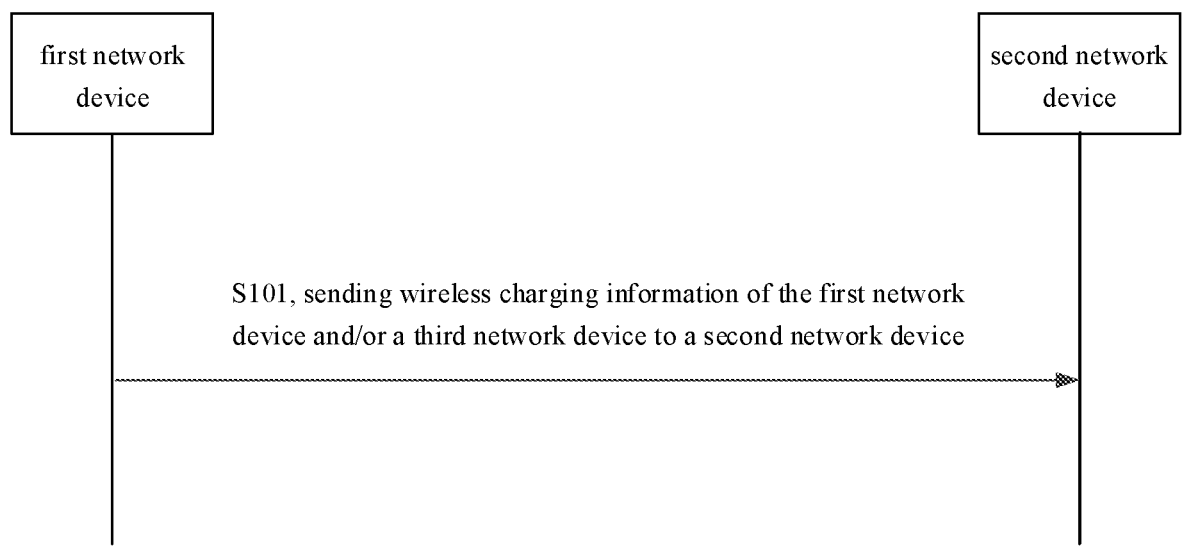
FIG. 2 is a flow chart showing a method for confirming wireless charging information performed by a first network device according to an illustrative embodiment.

As shown in FIG. 2, an embodiment of the present disclosure provides a method for confirming wireless charging information. The method is performed by a first network device and includes a step as follows.

In step S101, wireless charging information of the first network device and/or a third network device is sent to a second network device, in which the third network device is a network device of a neighboring cell of the first network device, and the wireless charging information is configured to indicate a wireless charging capability of the first network device and/or the third network device.

In an embodiment of the present disclosure, the first network device, the second network device and the third network device may be access network devices of a 4G system, a 5G system or other network systems, such as base stations. These network devices may have a capability to perform wireless charging on a terminal.

The wireless charging information is configured to indicate the wireless charging capability of the network device, for example, whether the network device may perform wireless charging, parameters of wireless charging supported by the network devices, and the like.

In an embodiment of the present disclosure, neighboring cells or network devices in a same area may exchange their respective wireless charging capabilities by sending wireless charging information to each other, so as to cooperate in performing the wireless charging on the terminal in a moving process of the terminal.

The first network device may send the wireless charging information of the first network device to the second network device, and may also send the wireless charging information of the third network device of the neighboring cell to the second network device. That is, the first network device may inform the second network device of the wireless charging information of the first network device or other wireless charging information that the first network device has acquired.

In this way, through a mutual transmission between the network devices, it is possible to quickly reach a consensus on their respective wireless charging capabilities in an area where these network devices are located, thus reducing a situation of a wireless charging interruption of the terminal in a moving process caused by the fact that the network devices do not know whether other network devices of the neighboring cell may perform the wireless charging. In a moving process of the terminal, an accessed network device may initiate a switching request to a corresponding network device through wireless charging information about the other network devices that has been learned, so that the terminal may continue to acquire a wireless charging service.

In some embodiments, the wireless charging information includes at least one of indicating information about whether the first network device and/or the third network device supports wireless charging, power information in which the first network device and/or the third network device supports wireless charging, and time information in which the first network device and/or the third network device supports wireless charging.

Here, the wireless charging information may include indication information about whether the network device supports a wireless charging function, corresponding time information and power information in which the network device supports a wireless charging function, and the like.

In this way, for the terminal accessed to the second network device, in case that a cell handover needs to be performed, the second network device may determine a network device matching a wireless charging demand of the terminal according to the wireless charging information that has been learned, and then request access to the first network device or the third network device, etc.

Figure 3:
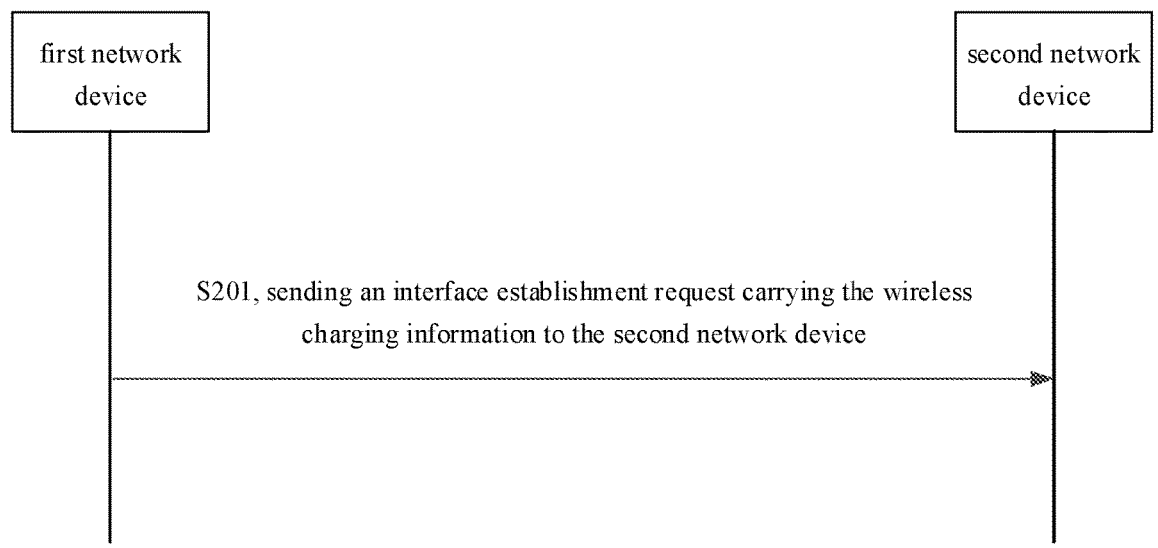
FIG. 3 is a flow chart showing a method for confirming wireless charging information performed by a first network device according to an illustrative embodiment.

As shown in FIG. 3, an embodiment of the present disclosure provides the method for confirming the wireless charging information. The method is performed by the first network device and includes a step as follows.

In step S201, an interface establishment request carrying the wireless charging information is sent to the second network device.

Here, in case that the first network device needs to establish a communication interface with the second network device, the wireless charging information may be sent to the second network device in an interface establishment process. The first network device may carry the wireless charging information of the first network device or the third network device in the interface establishment request, and inform the second network device of the wireless charging capability of the first network device or the third network device while requesting to establish the communication interface with the second network device.

In this way, in a process of establishing the communication interface between the network devices, a transmission of the wireless charging information may be realized, which is convenient for the network devices to reach a consensus on their respective wireless charging capabilities. In addition, since an existing interface establishment request is used to send the wireless charging information, no additional signaling overhead is needed, an application scope is wide, and the implementation is easy.

In some embodiments, the first network device is a universal evolution UMTS terrestrial radio access network (E-UTRAN) device, and the interface establishment request is an X2 interface establishment request, or the first network device is a new radio (NR) access network device, and the interface establishment request is an Xn interface establishment request.

The E-UTRAN device includes a terrestrial radio access network device in a fourth generation mobile communication, such as a 4G base station (namely, an e-NodeB). The NR access network device is an access network device of a fifth generation mobile communication, such as a 5G base station device. The E-UTRAN devices may communicate with each other through an X2 interface. The X2 interface is an interface between e-NodeBs and supports a direct transmission of data and signaling. The e-NodeBs are connected with each other via the X2 interface, forming a mesh network.

Therefore, in a process of establishing the X2 interface, the E-UTRAN device may use the X2 interface establishment request to carry the wireless charging information to inform the other party.

For an NR system, NR access networks may communicate with each other via an Xn interface. Therefore, in a process of establishing the Xn interface, the wireless charging information may be carried through the Xn interface establishment request.

In some embodiments, sending the interface establishment request carrying the wireless charging information to the second network device includes carrying the wireless charging information in a specified information unit of the interface establishment request, and sending the interface establishment request to the second network device, or carrying the wireless charging information in a newly added information unit of the interface establishment request, and sending the interface establishment request to the second network device.

In an embodiment of the present disclosure, in a process of establishing the communication interface with the second network device so far, the first network device may carry the wireless charging information in the interface establishment request and send it to the second network device. The interface establishment request includes multiple information units. The multiple information units are configured to inform the second network device of related information of the first network device and related information of the neighboring cell. Therefore, the first network device may use an existing information unit in the interface establishment request to carry the above-mentioned wireless charging information, so that a signaling format of the interface establishment request does not need to be changed.

Of course, an information unit dedicated to carrying the wireless charging information may also be newly added to the interface establishment request, that is, the above-mentioned newly added information unit, and the interface establishment request carrying the newly added information unit is sent to the second network device.

In some embodiments, the first network device is the E-UTRAN device, and the specified information unit of the interface establishment request includes at least one of a serving cell information unit, a neighboring cell information unit, and an NR neighboring cell information unit.

In an embodiment of the present disclosure, in case that the above-mentioned first network device is the E-UTRAN device, the first network device may establish an X2 interface with the second network device. Therefore, the first network device may carry the wireless charging information by using the specified information unit in the X2 interface establishment request. The specified information unit in the X2 interface establishment request may include the above-mentioned serving cell information unit and neighboring cell information unit. In case that the first network device sends the wireless charging information of the first network device to the second network device, the wireless charging information may be carried in the serving cell information unit. In case that the first network device sends the wireless charging information of the third network device of the neighboring cell to the second network device, the wireless charging information may be carried in the neighboring cell information unit. Moreover, in case that the third network device of the neighboring cell includes the access network device of the NR system, the wireless charging information may also be carried in the NR neighboring cell information unit.

Of course, the above-mentioned serving cell information unit may not be limited to carrying the wireless charging information of the first network device, and the neighboring cell information unit may not be limited to carrying the wireless charging information of the third network device. The wireless charging information may be carried in an appropriate information unit according to actual needs. For example, the wireless charging information of the first network device and the third network device is simultaneously carried in the neighboring cell information unit. That is, a situation where the above-mentioned information unit carries wireless charging information of a corresponding network device is merely illustrative. In practical applications, wireless charging information of multiple network devices may also be carried in a same information unit, or different parameters of wireless charging information of a same network device may be carried in multiple information units, respectively.

In this way, the first network device may carry corresponding wireless charging information through different existing information units in the interface establishment request, which is convenient for the second network device to learn a wireless charging capability of a network device in a related cell.

In some embodiments, the first network device is the NR access network device, the specified information unit of the interface establishment request is an NR serving cell list information unit, and the NR serving cell list information unit includes at least one of an NR serving cell information unit, an NR neighboring cell information unit, and an E-UTRAN neighboring cell information unit.

For the NR system, in case that the first network device is the NR access network device, the interface establishment request may be an Xn interface establishment request. Here, the Xn interface establishment request includes the NR serving cell list information unit. The NR serving cell list information unit is configured to indicate an NR serving cell list, and includes the above-mentioned NR serving cell information unit, the NR neighboring cell information unit, and the E-UTRAN neighboring cell information unit.

Similar to the X2 interface establishment request, the Xn interface establishment request also includes an information unit configured to indicate related information of the serving cell or the neighboring cell. In the case that the neighboring cell includes the E-UTRAN device, the neighboring cell may also include an E-UTRAN neighboring cell information unit. Therefore, the first network device may carry the wireless charging information of the first network device through the NR serving cell information unit. It is also possible to carry the wireless charging information of the neighboring cell in the NR neighboring cell information unit or the E-UTRAN neighboring cell information unit, thus facilitating the second network device to learn the wireless charging capability of each network device.

It is to be noted that a situation where the above-mentioned information unit carries the wireless charging information of the corresponding network device is merely illustrative. In practical applications, the wireless charging information of the multiple network devices may be carried in the same information unit, or the different parameters of the wireless charging information of the same network device are carried in the multiple information units, respectively.

In some embodiments, the first network device is the NR access network device, and the specified information unit of the interface establishment request is an E-UTRAN serving cell list information unit, and the E-UTRAN serving cell list information unit includes at least one of an E-UTRAN serving cell information unit, an NR neighboring cell information unit, and an E-UTRAN neighboring cell information unit.

Here, the Xn interface establishment request also includes the E-UTRAN serving cell list information unit. The E-UTRAN serving cell list information unit is configured to indicate an E-UTRAN serving cell list, and includes the above-mentioned E-UTRAN serving cell information unit, the NR neighboring cell information unit, and the E-UTRAN neighboring cell information unit.

The first network device may carry the wireless charging information of the first network device or the neighboring cell in the above-mentioned information unit and send it to the second network device.

Figure 4:
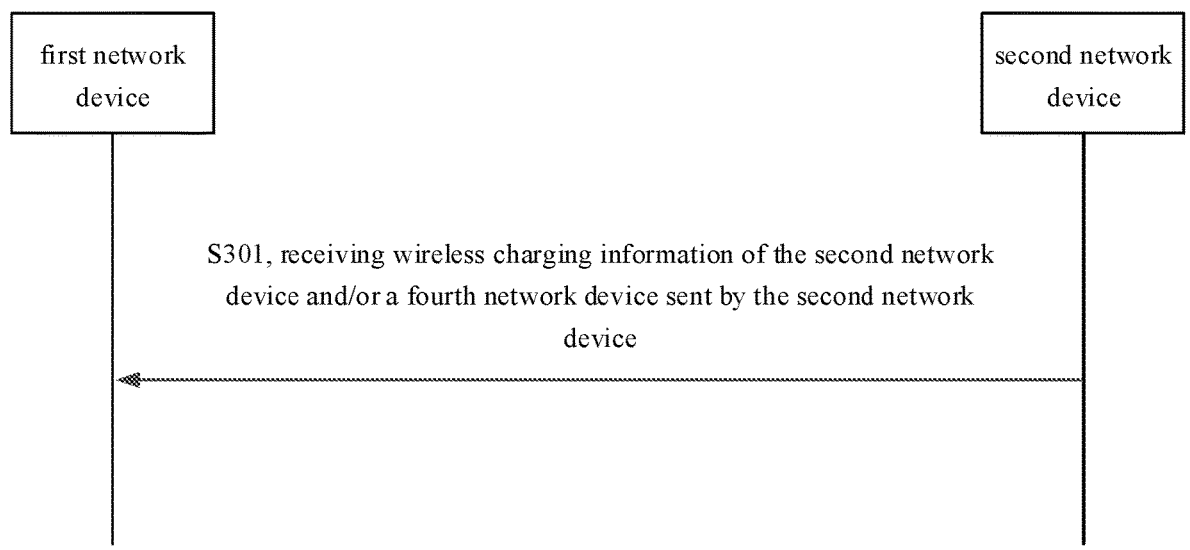
FIG. 4 is a flow chart showing a method for confirming wireless charging information performed by a first network device according to an illustrative embodiment.

As shown in FIG. 4, an embodiment of the present disclosure provides the method for confirming the wireless charging information. The method is performed by the first network device and includes a step as follows.

In step S301, wireless charging information of the second network device and/or a fourth network device sent by the second network device is received, in which the fourth network device is a network device of a neighboring cell of the second network device.

In an embodiment of the present disclosure, the first network device and the second network device may send the wireless charging information to each other. Here, the second network device may send the wireless charging information of the second network device or the fourth network device of the neighboring cell to the first network device.

The first network device may receive the above-mentioned wireless charging information in a process of establishing the communication interface between the first network device and the second network device. For example, when the second network device initiates an interface establishment request to establish a wireless interface with the first network device, the wireless charging information is carried in the interface establishment request, and the first network device acquires the above-mentioned wireless charging information by receiving the interface establishment request.

For another example, when the first network device initiates the interface establishment request to the second network device, the second network device sends an interface establishment response message to the first network device to establish the above-mentioned communication interface. Therefore, the first network device may receive the above-mentioned wireless charging information through the interface establishment response information.

In this way, the first network device and the second network device inform each other of their respective wireless charging information, and may also inform each other of wireless charging information of other network devices of their neighboring cells, so that network devices in multiple cells within a range reach a consensus on the wireless charging information of the network devices within the range.

Figure 5:
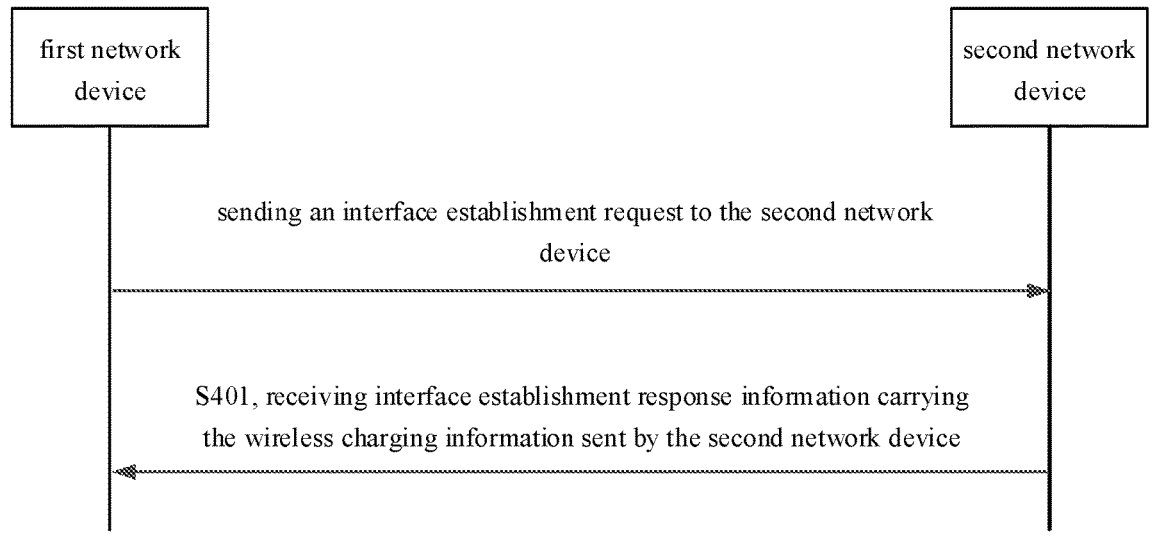
FIG. 5 is a flow chart showing a method for confirming wireless charging information performed by a first network device according to an illustrative embodiment.

As shown in FIG. 5, an embodiment of the present disclosure provides the method for confirming the wireless charging information. The method is performed by the first network device and includes a step as follows.

In step S401, interface establishment response information carrying the wireless charging information sent by the second network device is received.

Here, the first network device may send the interface establishment request to the second network device. When the second network device feeds back the interface establishment response information, the wireless charging information of the second network device and the fourth network device of the neighboring cell may be carried in the interface establishment response information. Therefore, the first network device may acquire the wireless charging information by receiving the interface establishment response information of the second network device.

An embodiment of the present disclosure provides the method for confirming the wireless charging information. The method is performed by the first network device. The method includes indicating, by the wireless charging information sent to the second network device, that the second network device or the fourth network device supporting wireless charging initiates a switching request, in response to a terminal accessed to the first network device switching to an accessed network device.

In case that the terminal accessed to the first network device is at an edge of a cell or moves, it may need to perform a cell handover and re-access other network devices. At this time, the first network device may determine the network device that supports charging requirements required by the terminal according to the wireless charging information sent by the second network device, and initiate the switching request. In this way, after switching to the accessed network device, the terminal may also receive corresponding wireless charging, which improves the user's experience.

An embodiment of the present disclosure provides the method for confirming the wireless charging information. The method is performed by the first network device. The method includes sending wireless charging change information of the first network device to the second network device, in response to a change of the wireless charging capability of the first network device, in which a communication interface is established between the second network device and the first network device.

When the communication interface is established between the first network device and the second network device, the first network device and the second network device may have sent their respective wireless charging information to each other. However, the wireless charging information of the network device may change, including a configuration of whether wireless charging is supported changes, a power range in which wireless charging is supported changes, and a time range in which wireless charging is supported changes, etc.

Illustratively, the first network device has sent the wireless charging information of the first network device and/or the third network device of the neighboring cell of the first network device to the second network device, but the wireless charging capability of the first network device changes, it needs to send updated related information to the second network device. Therefore, the first network device may send the wireless charging change information to the second network device.

Here, the wireless charging change information may be updated wireless charging information, or may merely include parameters of an updated part of the wireless charging information, etc.

In addition, when the wireless charging information of the third network device of the neighboring cell changes, the first network device may also send corresponding wireless charging change information to the second network device.

In this way, the multiple network devices may know a latest wireless charging capability of other network devices in real time.

In some embodiments, sending the wireless charging change information of the first network device to the second network device includes sending a configuration update message carrying the wireless charging change information to the second network device.

In an embodiment of the present disclosure, when the first network device sends the above-mentioned wireless charging change information to the second network device, since the first network device and the second network device have established the communication interface, the first network device cannot send the wireless charging change information through an interface establishment request. Here, the first network device may use the configuration update message to carry the wireless charging change information.

The configuration update message may be configured to send information, for example, an updated configuration parameter of the first network device. Therefore, the above-mentioned wireless charging change information may be carried in the configuration update message as the updated configuration parameter. Therefore, no additional signaling overhead is needed at this time, and an existing configuration update message may be used to inform the second network device of the change of the wireless charging capability at any time.

In some embodiments, the first network device is an E-UTRAN device, and the configuration update message is an evolved Node B (eNB) configuration update message.

The E-UTRAN device may be an evolved base station, that is, the above-mentioned eNB. Therefore, the above-mentioned configuration update message may be an existing configuration update message of the eNB, that is, the eNB configuration update message. The first network device may carry the wireless charging change information of the first network device or other network devices in the eNB configuration information and send it to the second network device.

In some embodiments, sending the configuration update message carrying the wireless charging change information to the second network device includes carrying the wireless charging change information in a newly added serving cell information unit or a changed serving cell information unit of the eNB configuration update message, and sending it to the second network device.

The first network device may carry the above-mentioned wireless charging change information in an existing information unit of the eNB configuration update message, or may add a new information unit to the eNB configuration update message dedicated to carrying the above-mentioned wireless charging change information.

In an embodiment of the present disclosure, the existing information unit of the above-mentioned eNB configuration update message may be the newly added serving cell information unit or the changed serving cell information unit, or the like.

In some embodiments, the first network device is an NR access network device, and the configuration update message is an access network device configuration update message.

For the NR system, the access network device configuration update message may be configured to carry the above-mentioned wireless charging change information. The first network device may send updated configuration information of the first network device to the second network device through the access network device configuration update message, and simultaneously send wireless charging related parameter changes to the second network device.

In some embodiments, sending the configuration update message carrying the wireless charging change information to the second network device includes carrying the wireless charging change information in an NG and/or NG-eNB information unit of the access network device configuration update message, and sending it to the second network device.

Here, the NG information unit is an information unit of related information of a radio access network, and the NG-eNB information unit is an information unit of related information of a radio access network base station. The first network device may carry the above-mentioned wireless charging change information in these information units and send it to the second network device.

Figure 6:
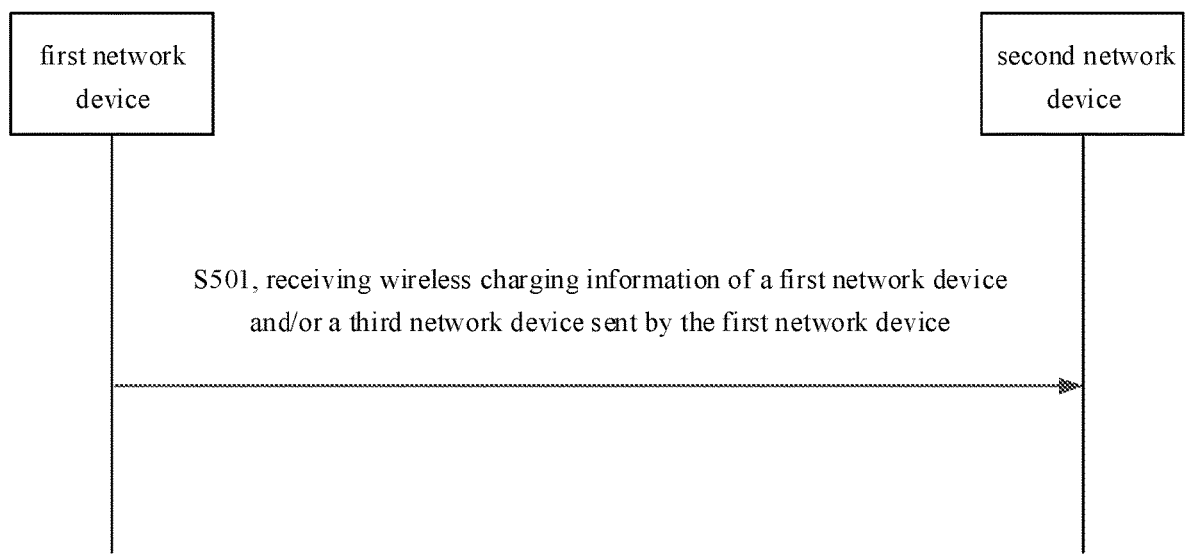
FIG. 6 is a flow chart showing a method for confirming wireless charging information performed by a second network device according to an illustrative embodiment.

As shown in FIG. 6, an embodiment of the present disclosure provides a method for confirming wireless charging information. The method is performed by a second network device and includes a step as follows.

In step S501, wireless charging information of a first network device and/or a third network device sent by the first network device is received, in which the third network device is a network device of a neighboring cell of the first network device, and the wireless charging information is configured to indicate a wireless charging capability of the first network device and/or the third network device.

Here, the wireless charging information is configured to indicate the wireless charging capability of the network device, for example, whether the network device may perform wireless charging, parameters of wireless charging supported by the network device, and the like.

In an embodiment of the present disclosure, neighboring cells or network devices in a same area may exchange their respective wireless charging capabilities by sending wireless charging information to each other, so as to cooperate in performing the wireless charging on the terminal in a moving process of the terminal.

The first network device may send the wireless charging information of the first network device to the second network device, and may also send the wireless charging information of the third network device of the neighboring cell to the second network device. That is, the second network device may receive the wireless charging information of the first network device and other network devices of the neighboring cell of the first network device via the first network device.

In this way, through a mutual transmission between the network devices, it is possible to quickly reach a consensus on their respective wireless charging capabilities in an area where these network devices are located, thus reducing a situation of a wireless charging interruption of the terminal in a moving process caused by the fact that the network devices do not know whether other network devices of the neighboring cell may perform the wireless charging. In a moving process of the terminal, an accessed network device may initiate a switching request to a corresponding network device through wireless charging information about the other network devices that has been learned, so that the terminal may continue to acquire a wireless charging service.

In some embodiments, receiving the wireless charging information of the first network device and/or the third network device sent by the first network device includes receiving an interface establishment request carrying the wireless charging information sent by the first network device.

In case that the second network device receives the interface establishment request, the second network device may establish a communication interface with the first network device. The first network device may carry the above-mentioned wireless charging information in the interface establishment request. Therefore, the second network device may acquire a related configuration of the first network device through the interface establishment request, and may simultaneously acquire the wireless charging information of the first network device or the third network device of the neighboring cell of the first network device.

An embodiment of the present disclosure provides the method for confirming the wireless charging information. The method is performed by the second network device. The method includes sending wireless charging information of the second network device and/or a fourth network device to the first network device, in which the fourth network device is a network device of a neighboring cell of the second network device.

The second network device may also send the wireless charging information of the second network device or the fourth network device of the neighboring cell to the first network device. That is, the second network device and the first network device may reach a consensus on the wireless charging information of related multiple network devices through an information interaction.

An embodiment of the present disclosure provides the method for confirming the wireless charging information. The method is performed by the second network device. The method includes sending interface establishment response information carrying the wireless charging information to the first network device based on an interface establishment request sent by the first network device.

In case that the second network device receives the interface establishment request from the first network device, the second network device may acquire the wireless charging information sent by the first network device from the interface establishment request. After receiving the interface establishment request, the second network device may also send corresponding interface establishment response information to the first network device, so that the two network devices may perform information interaction with each other and establish a communication interface. Therefore, the second network device may carry the wireless charging information of the second network device or the fourth network device of the neighboring cell in the interface establishment response information and send it to the first network device.

In this way, through the information interaction between the first network device and the second network device in a process of establishing the communication interface, a consensus may be reached on wireless charging information of the related multiple network devices, which is convenient to perform the wireless charging on a mobile terminal through different network devices.

In some embodiments, the second network device is an evolution UMTS terrestrial radio access network (E-UTRAN) device, and the interface establishment response information is X2 interface establishment response information, or the second network device is a new radio (NR) access network device, and the interface establishment response information is Xn interface establishment response information.

A communication interface between network devices, such as base stations, in an E-UTRAN system may be an X2 interface. Therefore, the above-mentioned wireless charging information may be carried in an X2 interface establishment request and corresponding X2 interface establishment response information in a process of establishing the X2 interface.

In some embodiments, sending the interface establishment response information carrying the wireless charging information to the first network device includes carrying the wireless charging information in a specified information unit of the interface establishment response information, and sending the interface establishment response information to the first network device, or carrying the wireless charging information in a newly added information unit of the interface establishment response information, and sending the interface establishment response information to the first network device.

When the second network device sends the wireless charging information to the first network device through the interface establishment response information, the second network device may use an existing information unit in the interface establishment response information or add a new dedicated information unit.

In some embodiments, the second network device is the E-UTRAN device, and the specified information unit of the interface establishment response information includes at least one of a serving cell information unit, a neighboring cell information unit, and an NR neighboring cell information unit.

Illustratively, for the E-UTRAN device, the existing information unit in the X2 interface establishment response information sent in the process of establishing the X2 interface may include the above-mentioned serving cell information unit, the neighboring cell information unit, and the NR neighboring cell information unit, etc. Therefore, the wireless charging information may be carried in these information units without adding a new information unit, thus saving signaling overhead.

Embodiments of the present disclosure also provide the following example.

With the development of a cellular mobile communication technology, especially a millimeter wave communication technology, more and more antennas may be equipped on a base station. For example, a Massive MIMO is one of key technologies of 5G. How to realize wireless charging through a cellular network is a problem that needs to be solved. Therefore, an embodiment of the present disclosure provides the following methods to enable the base stations to determine their respective supported wireless charging capabilities from each other, so that wireless charging performed on a terminal may be continuously charged in a moving process.

Illustratively, a base station 1 that supports wireless charging may establish an inter-base station interface with a base station 2. In a process of establishing the inter-base station interface, wireless charging information of the base station 1 and/or other base stations of a neighboring cell are/is sent, so as to inform the base station 2 of the wireless charging capability of the base station 1 or other base stations.

The above-mentioned wireless charging capability includes, but is not limited to, whether wireless charging is supported, power to support wireless charging, and time to support wireless charging, etc.

For an E-UTRAN system, an interaction may be done through an X2AP signaling of an X2 interface.

The base station 1 may inform the base station 2 of the wireless charging capability supported by the base station 1 and/or the neighboring cell of the base station 1 through an X2 interface establishment request signaling.

In some embodiments, the base station 1 may add the wireless charging information to an information unit, such as a serving cell information unit and/or a neighboring cell information unit and/or an NR neighboring cell information unit, in the X2 interface establishment request signaling, or may add a new information unit to the X2 interface establishment request signaling separately.

For an NR system, an interaction may be done through an XnAP signaling of an Xn interface.

Illustratively, the base station 1 may inform the base station 2 of the wireless charging capability supported by the base station 1 and/or the neighboring cell through an Xn interface establishment request signaling.

In some embodiments, the base station 1 may add the wireless charging information to an NR serving cell list information unit, such as an NR serving cell information unit and/or an NR neighboring cell information unit and/or an E-UTRA (E-UTRAN) neighboring cell information unit, in the Xn interface establishment request signaling, or may add a new information unit to the Xn interface establishment request signaling separately.

In some embodiments, the base station 1 may also add the wireless charging information to an E-UTRA serving cell list information unit, such as an E-UTRA serving cell information unit and/or an NR neighboring cell information unit and/or an E-UTRA (E-UTRAN) neighboring cell information unit, in the Xn interface establishment request signaling.

In some embodiments, a new information unit may also be added to the Xn interface establishment request signaling separately.

When the base station 2 supporting wireless charging receives the interface establishment request sent by the base station 1, the base station 2 sends capability information of the wireless charging supported by the base station 2 and/or a neighboring cell to the base station 1.

For an E-UTRAN system, an interaction may be done through an X2AP signaling of an X2 interface.

In some embodiments, the base station 2 may inform the base station 1 of the wireless charging capability supported by the base station 2 and/or the neighboring cell of the base station 2 through the X2 interface establishment response information.

In some embodiments, the base station 2 may add the wireless charging capability information to a serving cell information unit and/or a neighboring cell information unit and/or an NR neighboring cell information unit in the X2 interface establishment response information, or may add a new information unit to the X2 interface establishment response information separately.

For an NR system, an interaction may be done through an XnAP signaling of an Xn interface.

In some embodiments, the base station 2 may inform the base station 1 of the wireless charging capability supported by the base station 2 and/or the neighboring cell of the base station 2 through the Xn interface establishment response information.

When a wireless charging capability supported by a certain base station changes, the certain base station informs a base station that has an inter-base station interface with the certain base station of a change of the wireless charging capability supported by the certain base station.

For an E-UTRAN system, an interaction may be done through an X2AP signaling of an X2 interface.

In some embodiments, it may be added to an eNB configuration information update (ENB CONFIGURATION UPDATE) signaling to inform it of a change of the wireless charging capability supported by it.

In some embodiments, the base station 1 may inform the base station 2 of a change of the wireless charging capability supported by the base station 1 by adding the wireless charging change information to a newly added serving cell and/or a serving cell to modify information unit in the eNB configuration information update signaling.

For an NR system, an interaction may be done through an XnAP signaling of an Xn interface.

In some embodiments, the base station 1 may inform the base station 2 of a change of the wireless charging capability supported by the base station 1 by adding the wireless charging change information to a NG-RAN node configuration update signaling.

In some embodiments, the base station 1 may inform the base station 2 of a change of a wireless charging capability supported by the base station 1 by adding the wireless charging change information to a NG and/or a NG-eNB information unit in a NG-RAN node configuration update signaling.

In the embodiment of the present disclosure, when a terminal connected to the base station 1 that is undergoing the wireless charging needs to be switched in a moving process, the base station 1 may preferentially select the base station 2 that supports the wireless charging as a target base station to initiate a handover.

The embodiment of the present disclosure provides the method for confirming the wireless charging information. Through the method provided in the embodiment of the present disclosure, the wireless charging capabilities of the network devices may be confirmed from each other through the wireless charging information. In this way, the terminal accessed to the network device may be provided with a wireless charging service by the network device having the wireless charging capability. Moreover, since the wireless charging information of the network devices is confirmed from each other, even if the terminal moves and switches between cells, the charging of the network device may be obtained in time.

Figure 7:
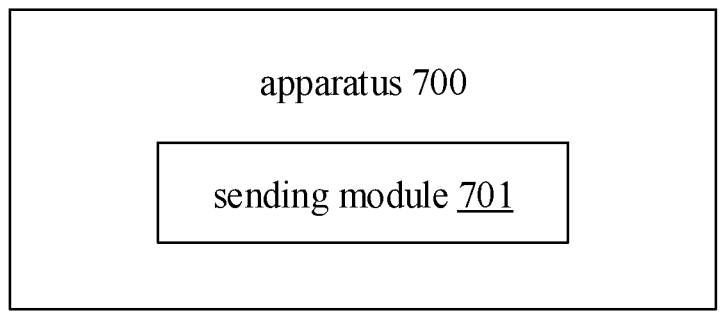
FIG. 7 is a block diagram showing an apparatus for confirming wireless charging information applied to a first network device according to an illustrative embodiment.

As shown in FIG. 7, an embodiment of the present disclosure also provides an apparatus 700 for confirming wireless charging information. The apparatus 700 is applied to a first network device. The apparatus 700 includes a sending module 701 configured to send wireless charging information of the first network device and/or a third network device to a second network device, in which the third network device is a network device of a neighboring cell of the first network device, and the wireless charging information is configured to indicate a wireless charging capability of the first network device and/or the third network device.

In some embodiments, the wireless charging information includes at least one of indicating information about whether the first network device and/or the third network device supports wireless charging, power information in which the first network device and/or the third network device supports wireless charging, and time information in which the first network device and/or the third network device supports wireless charging.

In some embodiments, the sending module is further configured to send an interface establishment request carrying the wireless charging information to the second network device.

In some embodiments, the first network device is a universal evolution UMTS terrestrial radio access network (E-UTRAN) device, and the interface establishment request is an X2 interface establishment request, or the first network device is a new radio (NR) access network device, and the interface establishment request is an Xn interface establishment request.

In some embodiments, the sending module is further configured to carry the wireless charging information in a specified information unit of the interface establishment request, and send the interface establishment request to the second network device, or carry the wireless charging information in a newly added information unit of the interface establishment request, and send the interface establishment request to the second network device.

In some embodiments, the first network device is the E-UTRAN device, and the specified information unit of the interface establishment request includes at least one of a serving cell information unit, a neighboring cell information unit, and an NR neighboring cell information unit.

In some embodiments, the first network device is the NR access network device, the specified information unit of the interface establishment request is an NR serving cell list information unit, and the NR serving cell list information unit includes at least one of an NR serving cell information unit, an NR neighboring cell information unit, and an E-UTRAN neighboring cell information unit.

In some embodiments, the first network device is the NR access network device, and the specified information unit of the interface establishment request is an E-UTRAN serving cell list information unit, and the E-UTRAN serving cell list information unit includes at least one of an E-UTRAN serving cell information unit, an NR neighboring cell information unit, and an E-UTRAN neighboring cell information unit.

In some embodiments, the apparatus further includes a receiving module configured to receive wireless charging information of the second network device and/or a fourth network device sent by the second network device, in which the fourth network device is a network device of a neighboring cell of the second network device.

In some embodiments, the receiving module is further configured to receive interface establishment response information carrying the wireless charging information sent by the second network device.

In some embodiments, the sending module is further configured to indicate, by the wireless charging information sent to the second network device, that the second network device or the fourth network device supporting wireless charging initiates a switching request, in response to a terminal accessed to the first network device switching to an accessed network device.

In some embodiments, the sending module is further configured to send wireless charging change information of the first network device to the second network device, in response to a change of the wireless charging capability of the first network device, in which a communication interface is established between the second network device and the first network device.

In some embodiments, the sending module is further configured to send a configuration update message carrying the wireless charging change information to the second network device.

In some embodiments, the first network device is an E-UTRAN device, and the configuration update message is an evolved Node B (eNB) configuration update message.

In some embodiments, the sending module is further configured to carry the wireless charging change information in a newly added serving cell information unit or a changed serving cell information unit of the eNB configuration update message, and send it to the second network device.

In some embodiments, the first network device is an NR access network device, and the configuration update message is an access network device configuration update message.

In some embodiments, the sending module is further configured to carry the wireless charging change information in an NG and/or NG-eNB information unit of the access network device configuration update message, and send it to the second network device.

Figure 8:
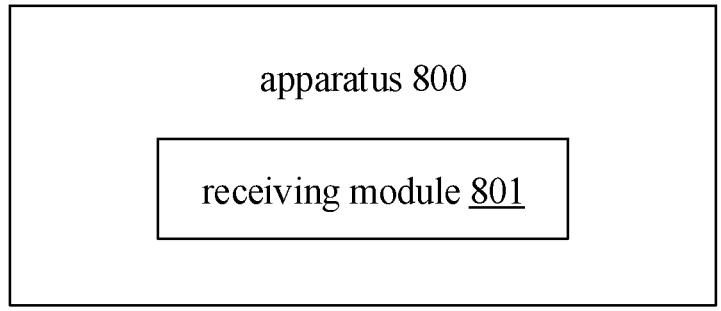
FIG. 8 is a block diagram showing an apparatus for confirming wireless charging information applied to a second network device according to an illustrative embodiment.

As shown in FIG. 8, an embodiment of the present disclosure also provides an apparatus 800 for determining wireless charging information. The apparatus 800 is applied to a second network device. The apparatus 800 includes a receiving module 801 configured to receive wireless charging information of a first network device and/or a third network device sent by the first network device, in which the third network device is a network device of a neighboring cell of the first network device, and the wireless charging information is configured to indicate a wireless charging capability of the first network device and/or the third network device.

In some embodiments, the receiving module is further configured to receive an interface establishment request carrying the wireless charging information sent by the first network device.

In some embodiments, the apparatus further includes a sending module configured to send wireless charging information of the second network device and/or a fourth network device to the first network device, in which the fourth network device is a network device of a neighboring cell of the second network device.

In some embodiments, the sending module is further configured to send interface establishment response information carrying the wireless charging information to the first network device based on an interface establishment request sent by the first network device.

In some embodiments, the second network device is an evolution UMTS terrestrial radio access network (E-UTRAN) device, and the interface establishment response information is X2 interface establishment response information, or the second network device is a new radio (NR) access network device, and the interface establishment response information is Xn interface establishment response information.

In some embodiments, the sending module is further configured to carry the wireless charging information in a specified information unit of the interface establishment response information, and send the interface establishment response information to the first network device, or carry the wireless charging information in a newly added information unit of the interface establishment response information, and send the interface establishment response information to the first network device.

In some embodiments, the second network device is the E-UTRAN device, and the specified information unit of the interface establishment response information includes at least one of a serving cell information unit, a neighboring cell information unit, and an NR neighboring cell information unit.

Regarding the apparatus in the above-mentioned embodiment, the specific manner in which each module performs operations has been described in detail in the embodiment of the method, which will not be elaborated herein.

Figure 9:
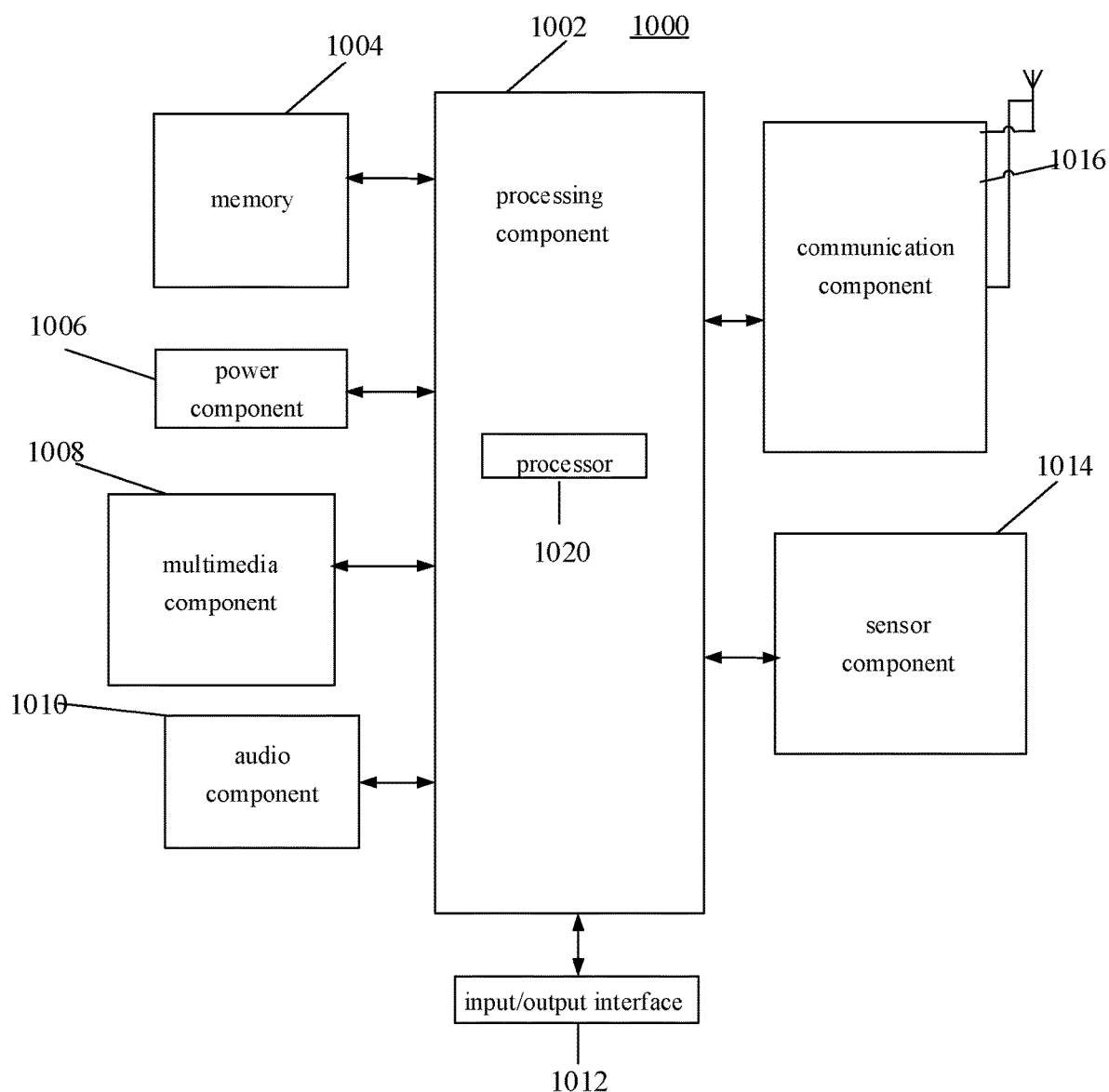
FIG. 9 is a schematic diagram showing a communication device according to an illustrative embodiment.

FIG. 9 is a block diagram of a communication device provided in an embodiment of the present disclosure. The communication device may be a terminal. For example, the communication device 1000 can be a mobile phone, a computer, a digital broadcast user equipment, a messaging device, a game console, a tablet device, a medical device, a fitness device, a personal digital assistant, or the like.

Referring to FIG. 9, the communication device 1000 may include at least of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the communication device 1000, such as the operations associated with display, phone calls, data communications, camera operations, and recording operations. The processing component 1002 can include at least one processor 1020 to execute code instructions to perform all or some of the steps in the above-described methods. Moreover, the processing component 1002 may include at least one module which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the communication device 1000. Examples of such data include code instructions for any applications or methods operated on the communication device 1000, contact data, phonebook data, messages, pictures, videos, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the communication device 1000. The power component 1006 may include a power management system, at least one power source, and any other components associated with the generation, management, and distribution of power in the communication device 1000.

The multimedia component 1008 includes a screen providing an output interface between the communication device 1000 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a wake up time and a pressure associated with the touch or swipe action. In some embodiments, the multimedia component 1008 includes a front camera and/or a rear camera. The front camera and/or the rear camera may receive an external multimedia datum while the communication device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC) configured to receive an external audio signal when the communication device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as keyboards, click wheels, buttons, and the like. The buttons may include, but are not limited to, a home button, a volume button, a starting button, and a locking button.

The sensor component 1014 includes at least one sensor to provide status assessments of various aspects of the communication device 1000. For instance, the sensor component 1014 may detect an open/closed status of the communication device 1000, relative positioning of components, e.g., the display and the keypad, of the communication device 1000, a change in position of the communication device 1000 or a component of the communication device 1000, a presence or absence of user contact with the communication device 1000, an orientation or an acceleration/deceleration of the communication device 1000, and a change in temperature of the communication device 1000. The sensor component 1014 may include a proximity sensor configured to detect the presence of nearby objects without any physical contact. The sensor component 1014 may further include a light sensor, such as a CMOS or CCD image sensor, for use in imaging applications. In some embodiments, the sensor component 1014 may further include an accelerometer sensor, a gyroscope sensor, a magnetic sensor, a pressure sensor, or a temperature sensor.

The communication component 1016 is configured to facilitate communication, wired or wireless, between the communication device 1000 and other devices. The communication device 1000 can access a wireless network based on a communication standard, such as WiFi, 2G, or 3G, or a combination thereof. In an illustrative embodiment, the communication component 1016 receives a broadcast signal or broadcast associated information from an external broadcast management system via a broadcast channel. In an illustrative embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the communication device 1000 may be implemented with at least one application specific integrated circuit (ASIC), a digital signal processor (DSP), a digital signal processing device (DSPD), a programmable logic device (PLD), a field programmable gate array (FPGA), a controller, a micro-controller, a microprocessor, or other electronic elements, for performing the above-mentioned methods.

In an illustrative embodiment, there is also provided a non-transitory computer readable storage medium including instructions, such as included in the memory 1004, executable by the processor 1020 in the communication device 1000, for completing the above-mentioned methods. For example, the non-transitory computer-readable storage medium may be a ROM, a random access memory (RAM), a CD-ROM, a magnetic tape, a floppy disc, an optical data storage device, and the like.

Figure 10:
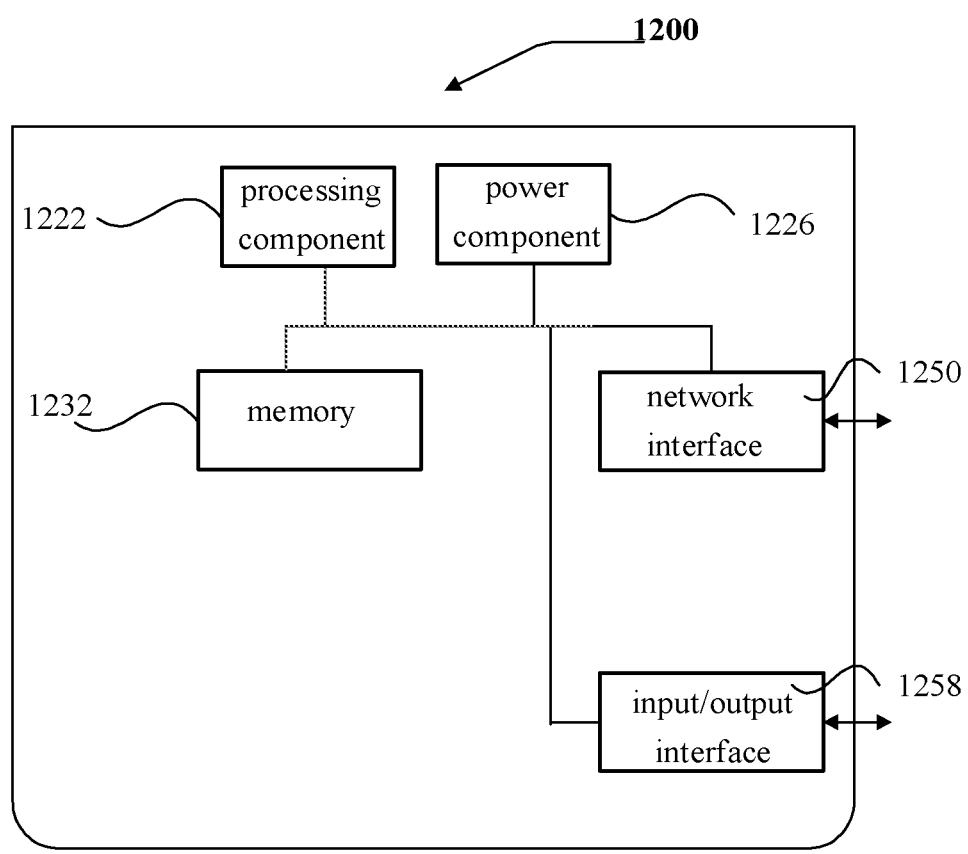
FIG. 10 is a schematic diagram showing a communication device such as a base station according to an illustrative embodiment.

As shown in FIG. 10, an embodiment of the present disclosure shows a structure of another communication device. The communication device may be a base station according to an embodiment of the present disclosure. For example, the communication device 1200 may be provided as a network device. Referring to FIG. 10, the communication device 1200 includes a processing component 1222, which further includes at least one processor, and memory resources represented by a memory 1232 for storing instructions executable by the processing component 1222, such as an application program. The application program stored in the memory 1232 may include one or more modules each corresponding to a set of instructions. In addition, the processing component 1222 is configured to execute instructions to perform any of the above-mentioned methods performed by the communication device.

The communication device 1200 may further include a power component 1226 configured to perform power management of the communication device 1200, a wired or wireless network interface 1250 configured to connect the communication device 1200 to a network, and an input/output (I/O) interface 1258. The communication device 1200 may operate based on an operating system stored in the memory 1232, such as Windows Server™, Mac OS X™, Unix™, Linux™, FreeBSD™, or the like.

Other embodiments of the disclosure will be apparent to those skilled in the art from consideration of the specification and practice of the disclosure disclosed here. The present disclosure is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for confirming wireless charging information, performed by a first network device, comprising:
sending wireless charging information of the first network device and a third network device to a second network device, wherein the third network device is a network device of a neighboring cell of the first network device; and the wireless charging information is configured to indicate a wireless charging capability of the first network device and the third network device.

2. The method of claim 1, wherein the wireless charging information comprises at least one of:
indicating information about whether the first network device and the third network device supports wireless charging;
power information in which the first network device and the third network device supports wireless charging; and
time information in which the first network device and the third network device supports wireless charging.

3. The method of claim 1, further comprising:
sending an interface establishment request carrying the wireless charging information to the second network device.

4. The method of claim 3, wherein the first network device is a universal evolution UMTS terrestrial radio access network (E-UTRAN) device, and the interface establishment request is an X2 interface establishment request; or
the first network device is a new radio (NR) access network device, and the interface establishment request is an Xn interface establishment request.

5. The method of claim 4, wherein sending the interface establishment request carrying the wireless charging information to the second network device comprises:
carrying the wireless charging information in a specified information unit of the interface establishment request, and sending the interface establishment request to the second network device; or
carrying the wireless charging information in a newly added information unit of the interface establishment request, and sending the interface establishment request to the second network device.

6. The method of claim 5, wherein the first network device is the E-UTRAN device, and the specified information unit of the interface establishment request comprises at least one of:
a serving cell information unit;
a neighboring cell information unit; and
an NR neighboring cell information unit;
wherein the first network device is the NR access network device, the specified information unit of the interface establishment request is an NR serving cell list information unit, and the NR serving cell list information unit comprises at least one of:
an NR serving cell information unit;
an NR neighboring cell information unit; and
an E-UTRAN neighboring cell information unit; or
wherein the first network device is the NR access network device, and the specified information unit of the interface establishment request is an E-UTRAN serving cell list information unit, and the E-UTRAN serving cell list information unit comprises at least one of:
an E-UTRAN serving cell information unit;
an NR neighboring cell information unit; and
an E-UTRAN neighboring cell information unit.

7. The method of claim 1, further comprising:
receiving wireless charging information of the second network device and/or a fourth network device sent by the second network device, wherein the fourth network device is a network device of a neighboring cell of the second network device.

8. The method of claim 7, further comprising:
receiving interface establishment response information carrying the wireless charging information sent by the second network device; or
indicating, by the wireless charging information sent to the second network device, that the second network device or the fourth network device supporting wireless charging initiates a switching request, in response to a terminal accessed to the first network device switching to an accessed network device.

9. The method of claim 1, further comprising:
sending wireless charging change information of the first network device to the second network device, in response to a change of the wireless charging capability of the first network device; wherein a communication interface is established between the second network device and the first network device;
wherein sending the wireless charging change information of the first network device to the second network device comprises:
sending a configuration update message carrying the wireless charging change information to the second network device.

10. The method of claim 9, wherein the first network device is an E-UTRAN device, and the configuration update message is an evolved Node B (eNB) configuration update message;
wherein sending the configuration update message carrying the wireless charging change information to the second network device comprises:
carrying the wireless charging change information in a newly added serving cell information unit or a changed serving cell information unit of the eNB configuration update message, and sending it to the second network device.

11. The method of claim 9, wherein the first network device is an NR access network device, and the configuration update message is an access network device configuration update message;
wherein sending the configuration update message carrying the wireless charging change information to the second network device comprises:
carrying the wireless charging change information in an NG and NG-eNB information unit of the access network device configuration update message, and sending it to the second network device.

12. A method for determining wireless charging information, performed by a second network device, comprising:
receiving wireless charging information of a first network device and a third network device sent by the first network device, wherein the third network device is a network device of a neighboring cell of the first network device; and the wireless charging information is configured to indicate a wireless charging capability of the first network device and the third network device.

13. The method of claim 12, wherein receiving the wireless charging information of the first network device and the third network device sent by the first network device comprises:
receiving an interface establishment request carrying the wireless charging information sent by the first network device.

14. The method of claim 12, further comprising:
sending wireless charging information of the second network device and/or a fourth network device to the first network device; wherein the fourth network device is a network device of a neighboring cell of the second network device.

15. The method of claim 14, further comprising:
sending interface establishment response information carrying the wireless charging information to the first network device based on an interface establishment request sent by the first network device.

16. The method of claim 15, wherein the second network device is an evolution UMTS terrestrial radio access network (E-UTRAN) device, and the interface establishment response information is X2 interface establishment response information; or
the second network device is a new radio (NR) access network device, and the interface establishment response information is Xn interface establishment response information.

17. The method of claim 16, wherein sending the interface establishment response information carrying the wireless charging information to the first network device comprises:
carrying the wireless charging information in a specified information unit of the interface establishment response information, and sending the interface establishment response information to the first network device; or
carrying the wireless charging information in a newly added information unit of the interface establishment response information, and sending the interface establishment response information to the first network device.

18. The method of claim 17, wherein the second network device is the E-UTRAN device, and the specified information unit of the interface establishment response information comprises at least one of:
a serving cell information unit;
a neighboring cell information unit; and
an NR neighboring cell information unit.

19. A communication device, at least comprising:
a processor; and
an interface circuit;
wherein the interface circuit is configured to receive code instructions and transmit them to the processor;
the processor is configured to execute the code instructions to perform steps in the method provided in claim 12.

20. A communication device, at least comprising:
a processor; and
an interface circuit;
wherein the interface circuit is configured to receive code instructions and transmit them to the processor;
the processor is configured to:
send wireless charging information of a first network device and a third network device to a second network device, wherein the third network device is a network device of a neighboring cell of the first network device; and the wireless charging information is configured to indicate a wireless charging capability of the first network device and the third network device.

* * * * *